(12) United States Patent
Rodgers

(10) Patent No.: US 6,400,751 B1
(45) Date of Patent: Jun. 4, 2002

(54) ADAPTIVE FREQUENCY SHARING METHOD AND APPARATUS

(75) Inventor: William Ellis Rodgers, Fort Wayne, IN (US)

(73) Assignee: ITT Manufacturing Enterprises, Inc.

( * ) Notice: Subject to any disclaimer, the term of this patent is extended or adjusted under 35 U.S.C. 154(b) by 0 days.

(21) Appl. No.: 09/108,818

(22) Filed: Jul. 1, 1998

(51) Int. Cl.$^7$ ............................................. H04L 27/30
(52) U.S. Cl. ...................................................... 375/132
(58) Field of Search .............................. 375/132, 130, 375/138, 134, 135, 136, 146, 147

(56) References Cited

U.S. PATENT DOCUMENTS

| | | | |
|---|---|---|---|
| 5,029,182 A | | 7/1991 | Cai et al. ...................... 375/130 |
| 6,078,612 A | * | 6/2000 | Bertrand et al. ............. 375/219 |
| 6,111,909 A | * | 8/2000 | Taki ............................. 375/132 |
| 6,115,407 A | * | 9/2000 | Gendel et al. ............... 375/132 |
| 6,122,309 A | * | 9/2000 | Bergstrom et al. .......... 375/130 |

\* cited by examiner

Primary Examiner—Chi Pham
Assistant Examiner—Khai Tran
(74) Attorney, Agent, or Firm—Duane Morris LLP; Arthur L. Plevy

(57) ABSTRACT

In a frequency hopping (FH) communication system comprising a plurality of radios operable in a first FH mode for transceiving information over a plurality of frequency channels corresponding to frequencies defining a frequency hop set, a method for adaptively selecting a single frequency channel within said hop set and transceiving said information over only said single frequency channel, said method comprising the steps of determining the quality of frequency hopping transmissions received at a receiving radio terminal in the first FH mode and providing a control signal when said quality is unacceptable; and operating the radio in a single frequency mode in response to the control signal when the FH transmission quality is unacceptable by transmitting the information over only a single frequency channel within the frequency hopping set which has an interfering energy level below a threshold value indicative of acceptable transmission quality.

36 Claims, 9 Drawing Sheets

ADAPTIVE FREQUENCY SHARING METHOD AND APPARATUS

FIELD OF THE INVENTION

The invention relates generally to communication systems, and more particularly to a method for adaptive frequency sharing for use in a frequency hopping communication system.

BACKGROUND OF THE INVENTION

Frequency hopping is a commonly used technique to provide a secured communication system. Frequency hopping involves the changing of the radio carrier or center frequencies periodically to avoid detection or jamming. That is, frequency hopping transmission systems are a type of spread spectrum system in which a wideband signal is generated by hopping from one frequency to another over a large number of frequency choices. In systems employing very fast frequency hopping, the signal is transmitted at each frequency for a very short period such as 20 milliseconds. The frequencies used are chosen by a pseudo random code similar to those used in direct sequence systems. For general background on spread spectrum systems, reference is made to a text entitled *Spread Spectrum Systems*, 2nd edition, by Robert C. Dixon and published by Wiley-Interscience, New York (1984). In order to increase the efficiency of digital radios employing spread spectrum characteristics, digital engineers have raised the number of modulation levels and have generally dealt with modulation/demodulation techniques, spectral shaping and synchronization schemes. This has led to widespread and more efficient use of the digital radio systems.

As one can ascertain, a major problem in the transmission of digital data signals is interference. Hence, interference or noise, in any communication system, plays an important part in the design and operation of the system. For general background on digital radio and particularly for microwave operation, reference is made to a text entitled *Microwave Digital Radio* edited by Larry J. Greenspan and Mansoor Shafi and published by the IEEE Press, the Institute of Electrical and Electronic Engineers, New York (1988).

Frequency Hop (FH) radios spread their transmitted RF energy over a wide frequency spectrum by transmitting only a short burst of data on any one frequency in the allocated frequency spectrum. FH radio effectiveness with jamming and interference is based on having a large hop set of frequencies spread over a wide frequency spectrum. The object is to either make a jammer or an interferer spread its energy over the full spectrum of hop set frequencies, thereby reducing the amount of interference energy on any single frequency, or to correct the errors due to interference on a small number of frequencies by the use forward error correction coding on the transmitted data. The frequencies used are chosen by a pseudo noise code similar to those used in direct sequence systems.

FH radios perform best when greater than half of the frequencies in the hop set do not contain interference. Otherwise, the required overhead associated with low rate, forward error correction code consumes a large percentage of the channel capacity and results in a large reduction in data throughput. Unfortunately, in government or military operations, allocation of frequencies is often restricted to a small set of available frequencies.

Because FH operation does not perform well where the number of hop set frequencies is restricted, the users of such FH radios experience less-than-optimal communication performance in the field. This frequency shortage has become a more severe problem with the large amount of wireless communications required for both military and civilian communications. Permission to use a large frequency hop set for military exercises and for joint NATO operations is becoming a more intense problem. In addition to the smaller frequency hop set, more FH nets are being required to share the same frequency hop set, further increasing the mutual interference.

Accordingly, a method for minimizing interference in a frequency hopping network whereby a single frequency may be selected for data communications, which is within a predetermined tolerance level and which has low interference energy to permit data transmission on that frequency, is highly desired.

SUMMARY OF THE INVENTION

It is an object of the present invention to provide in a frequency hopping (FH) communication system comprising a plurality of radios operable in a first FH mode for transceiving information over a plurality of frequency channels corresponding to frequencies defining a frequency hop set, a method for adaptively selecting a single frequency channel within said hop set and transceiving said information over only said single frequency channel, said method comprising the steps of determining the quality of frequency hopping transmissions received at a receiving radio terminal in the first FH mode and providing a control signal when said quality is unacceptable; and operating the radio in a single frequency mode in response to the control signal when the FH transmission quality is unacceptable by transmitting the information over only a single frequency channel within the frequency hopping set which has an interfering energy level below a threshold value indicative of acceptable transmission quality.

DETAILED DESCRIPTION OF THE INVENTION

Figure 1:
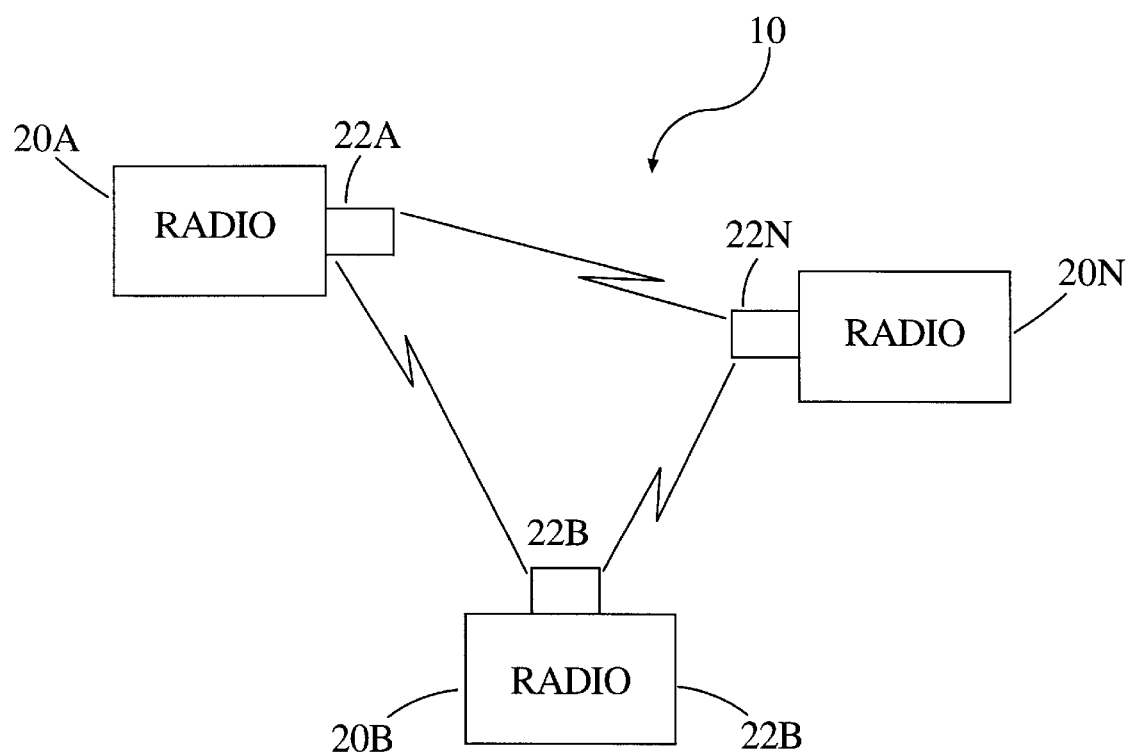
FIG. 1 is a schematic representation of a radio communication frequency hopping network comprising a plurality of radios in accordance with the present invention.

Before embarking on a detailed discussion, the following should be understood. A frequency hop radio receiver is operable to listen on any frequency within a group or set of frequencies for synchronization. In situations where the number of frequencies without significant noise or interference is below a certain percent, network data throughput is increased if the radio adaptively and intelligently selects one frequency for data communications which has low interference energy, and transmits all data on that frequency rather than hopping over the frequency set.

The apparatus and method according to the present invention allows the message originating radio to examine the energy on a set of candidate frequencies, select the frequency with minimal energy, (or energy below a predetermined threshold) and transmit the data on this frequency. This invention is compatible with other frequency hop radios by allowing the receiving radio to synchronize either to a frequency hop transmission or to the new adaptive single frequency transmission without operator intervention. The architecture and functionality of such a radio is detailed in co-pending commonly assigned patent application Ser. No. 08/857,990 entitled "Radio Architecture for an Advanced Digital Radio in a Digital Communication System", filed on May 16, 1997, and incorporated herein by reference. The invention also provides for passing Time-Of-Day (TOD) from the transmitter to the receiver during adaptive single frequency transmission mode. The frequencies in the frequency set can change based on a Time-Of-Day (TOD) clock. The transmitter sends adaptive single frequency transmission information on all synchronization frequencies in the FH set.

As previously mentioned, a frequency hop radio receiver is operable to listen on any frequency within a group or set of frequencies for synchronization. This allows the receiver to select a frequency having a minimum interfering energy.

For the method described herein, the message originator radio transmits adaptive single frequency information on the same frequencies as used for a Frequency Hop (FH) synchronization so that only a single channel receiver is required. The transmitted pattern for adaptive single frequency transmission is distinct from the FH pattern, thereby allowing the receiver to distinguish between normal FH transmission and the novel adaptive frequency transmissions.

One method of sending the distinctive patterns is to transmit one combination of synchronization patterns for FH and another pattern having a disjoint set of patterns for adaptive single frequency transmissions. In the single frequency mode, several patterns are transmitted. Each pattern is biphase modulated by one information bit. With frequency modulation signaling, the sign of the modulation is preserved while phase modulation signaling normally requires transmitting a reference phase bit for demodulation, as is well known in the art.

The radio communications system according to the present invention will now be described with reference made to the following figures, wherein like parts are indicated by like reference numerals.

Figure 2:
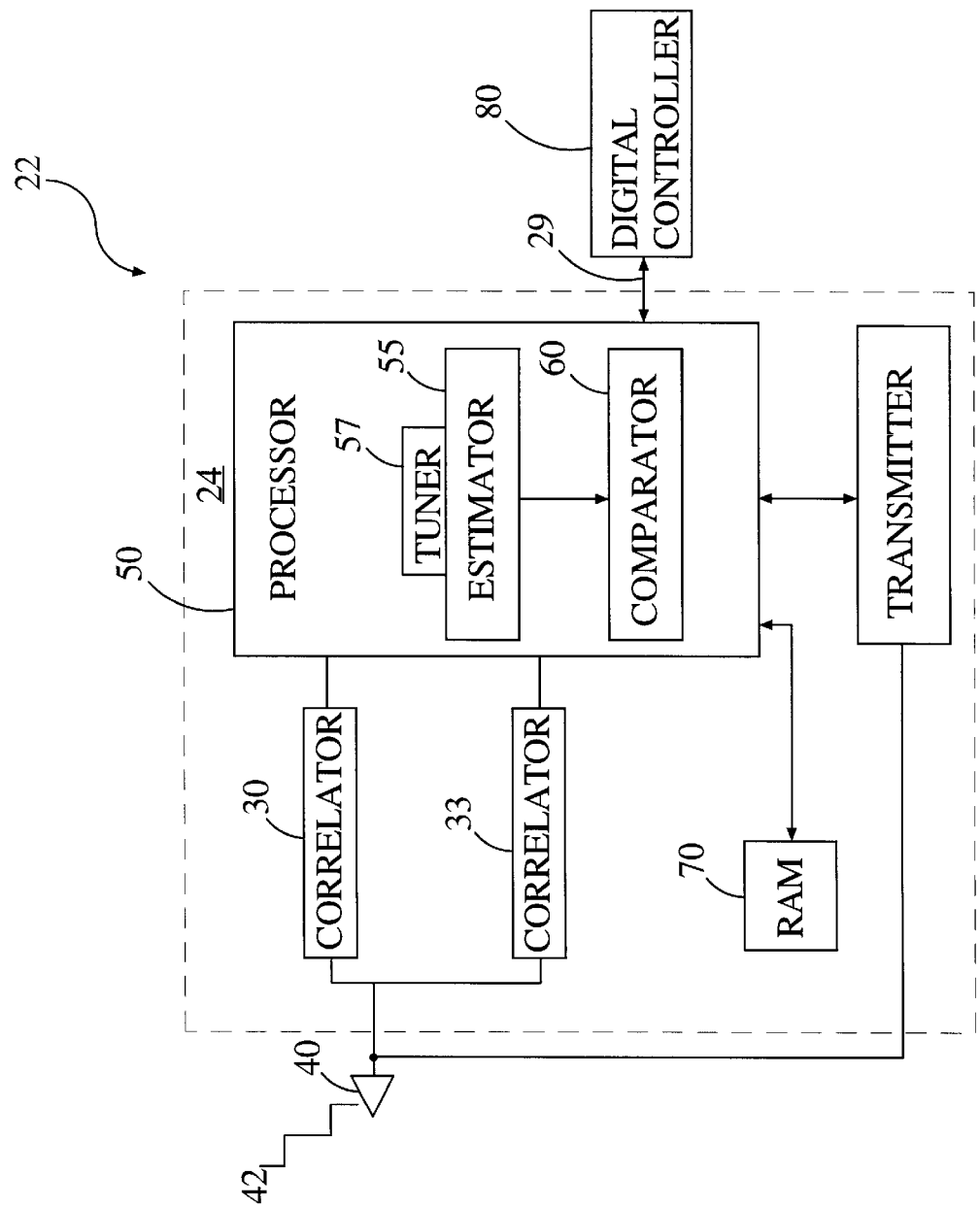
FIG. 2 is a block diagram of a radio transceiver module according to the present invention.
Figure 5:
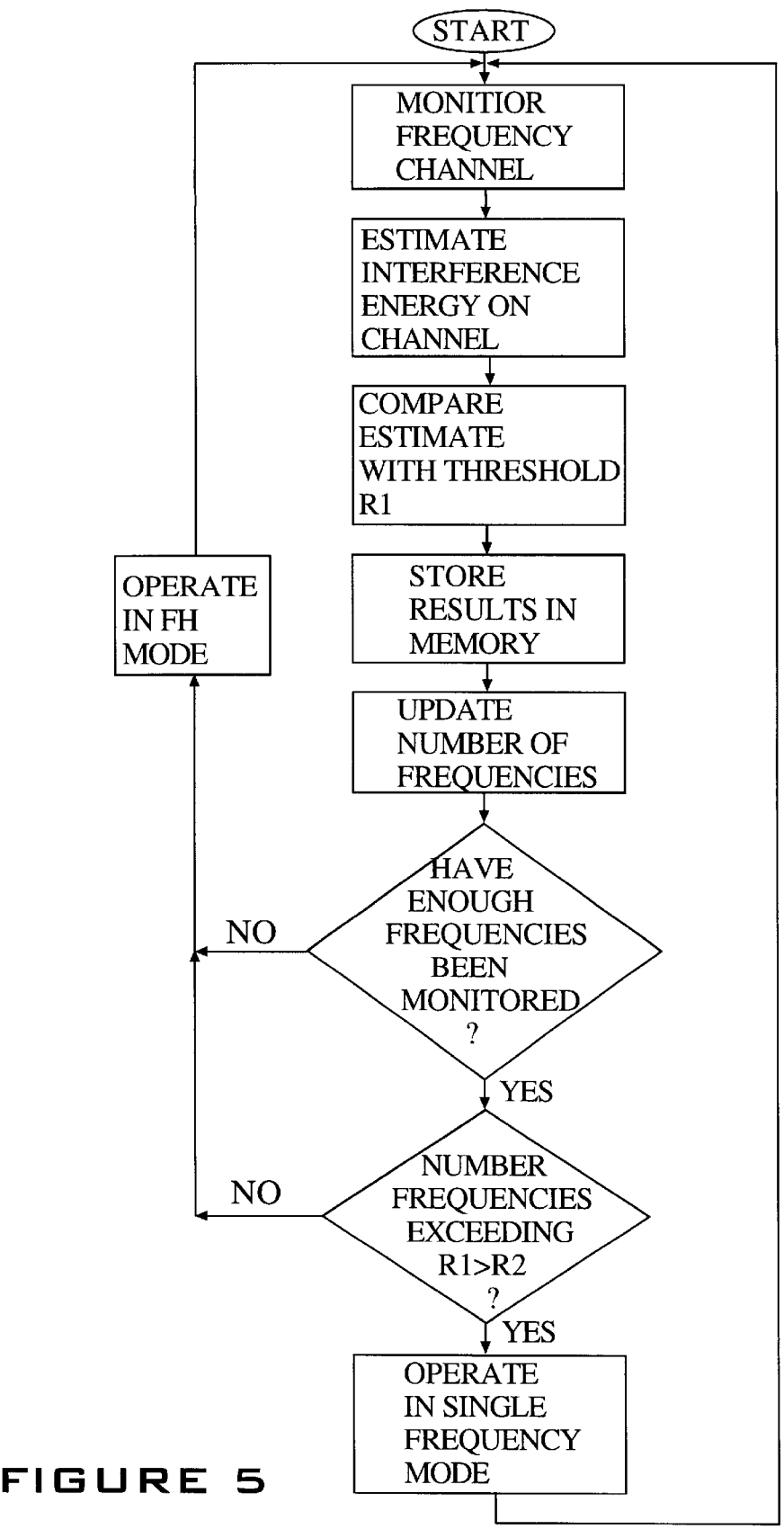
FIG. 5 is a flow chart depicting the steps for determining signal quality within a frequency hopping communication system.

A radio communication network 10 according to the present invention is shown in FIG. 1. The network 10 is a frequency hopping communication network wherein each of radios 20A, 20B . . . 20N transceive data with one another in a frequency hopping communication mode. Each radio includes a transmit/receiver (T/R) module 22 (22A, B, . . . ,N) for for transmitting data communications and for receiving data communications from another radio. In a frequency hopping mode of operation, a transmitting radio transmits information over a series of frequencies or frequency channels defining a frequency hop set. These frequencies may be a fixed set, or may change according to a time of day function, as is well known in the art. A receiver at a receiving radio is adapted to listen on those frequencies within a hop set and maintain synchronization with a transmitting radio for receiving the data communication transmitted over the hopping set of frequencies, so as to follow the frequency pattern in order to "demodulate" the data communication or information transmitted. In the present invention, as shown schematically in FIG. 2, a receiver portion 24 of T/R module 22 for each radio 20 comprises a pair of correlators 30, 32 coupled to RF antenna 40 for receiving signals transmitted from the transmitting radio and performing a pattern match of the incoming signal 42 to determine whether the signal is indicative of a frequency hopping mode (module 30) or a single frequency mode (module 32) of operation. That is, correlator 30 is configured to sense a first synchronization pattern in a signal transmission 42 from a transmitting radio indicative of a frequency hopping transmission of information. In contrast, correlator 32 is configured to sense a second synchronization pattern in the signal transmission which indicates that a single frequency transmission is forthcoming. Processor 50 is coupled to each of the correlators for receiving a signal output from the respective modules indicating the nature of the received transmission. Processor 50 includes hardware and software functionality for adaptively performing frequency selection and determining the mode (i.e. FH or single frequency mode) of operation of the radio. Processor 50 further includes an estimator circuit of a conventional type for measureing the SNR of the channel and estimatimating the interference energy associated with the particular frequency channel. Memory module 80, such as a RAM, is operable for storing frequency hopping data parameters, including the number of frequencies/frequency channels estimated or listened to by the receiver over a particular time interval t, as well as threshold parameters indicative of the quality of the frequency channels. Comparator circuit 60 is coupled to estimator 55 for comparing the estimated interference energy on each particular frequency channel on which the receiver is tuned to with a receiver threshold value R1 stored in memory 70. If the estimated energy level exceeds the R1 threshold value, that channel is deemed "noisy", and a parameter representing the number of perceived "noisy" frequency channels is updated and stored in memory 70. The comparator then compares the number of frequencies in the hop set exceeding the R1 value with a second threshold value R2 in order to assess the overall quality of the FH communication network. If the number of "noisy" channels exceeds the predetermined R2 threshold, then the comparator provides a control signal 29 to control unit 80 which indicates that the overall receiver channel quality is unacceptable for frequency hopping transmission. Control unit 80, in response to the control signal operates to change the mode of operation of the radio from FH to single frequency mode. In this manner, the processor operates to maintain and update statistical parameters associated with interference on each frequency in which the receiver is tuned to, in order to determine the overall interference associated with the channels in the frequency hopping system. When the processor determines that the level of interference is sufficiently great (i.e. exceeds a predetermined percentage of the frequency channels within the hop set) the processor is operable to cause the radio to switch to a single frequency mode. A flow chart depicting the above described operation is provided in FIG. 5. In this manner, when the transmitter associated with this radio performs a signal transmission, such transmission will occur in a single frequency mode of operation. Note that while a specific decision making scheme has been shown for determining the quality of frequency hopping transmissions, numerous other statistical analyses are capable of implementation within processor 50. For example, such statistical analysis may include sampling of the last N frequencies within a given time interval in order to determine the overall acceptability of FH communications, or may also require accumulation of information on at least N frequency channels within the hop set before making a determination regarding the acceptability of the FH communication mode.

Figure 3:
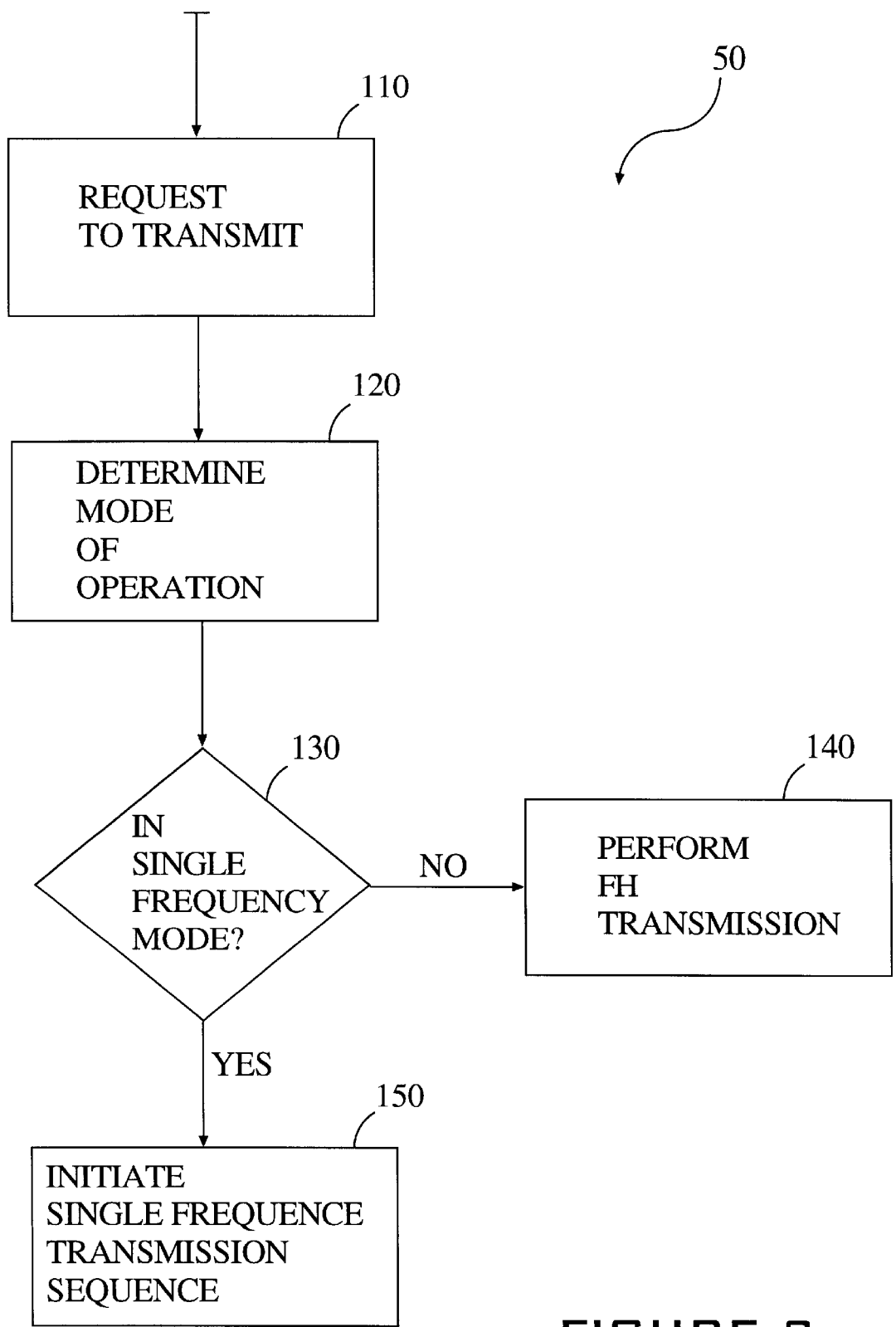
FIG. 3 is a flow chart depicting the steps involved in determining the mode of operation of a transmitting radio.

In any event, when a radio 22 is in single frequency mode, and a request to transmit a message is made by radio 22, processor 50 initiates a search of the set of hopping frequencies stored in memory 70 for one with minimal energy. A flow chart illustrating the general sequence of the transmitting radio processor 50 is provided in FIG. 3. As shown in the flow charts of FIGS. 3–4, after a request to transmit 110 has been made by a transmitting radio, and the radio determines that it is operative in Single Frequency (SF) mode (modules 130, 150), the frequency selection requires finding the first frequency in the set with energy below a threshold value. If none is found, the frequency with minimum energy is selected (module 230). In a preferred embodiment shown in FIG. 4, the frequency selection proceeds as follows. Processor 50 causes the transmitting radio to tune to a randomly selected frequency in the hop set (module 160) and estimate the interference energy on the tuned frequency during a short (4 ms) time dwell (module 170). If the energy is below a predetermined threshold (module 180), the frequency is then confirmed with a long (10 ms) dwell time test (module 190). That is, an interference energy level is "re-estimated" for a second time interval, then compared with the threshold value (module 200). If this check passes, the tuned frequency is selected as the single channel frequency (module 210). If the check fails, the radio moves on to the next frequency (module 240) and repeats the short and long tests until a frequency is found that passes both tests, or until all frequencies have been tested (module 220). Note that Processor 50 includes a tuner 57 operable to randomly select the first frequency to be checked. The random selection of available frequencies assures uniform channel usage by users. This also minimizes interference at receiving radios when they are within range of two or more transmitting radios.

Figure 7:
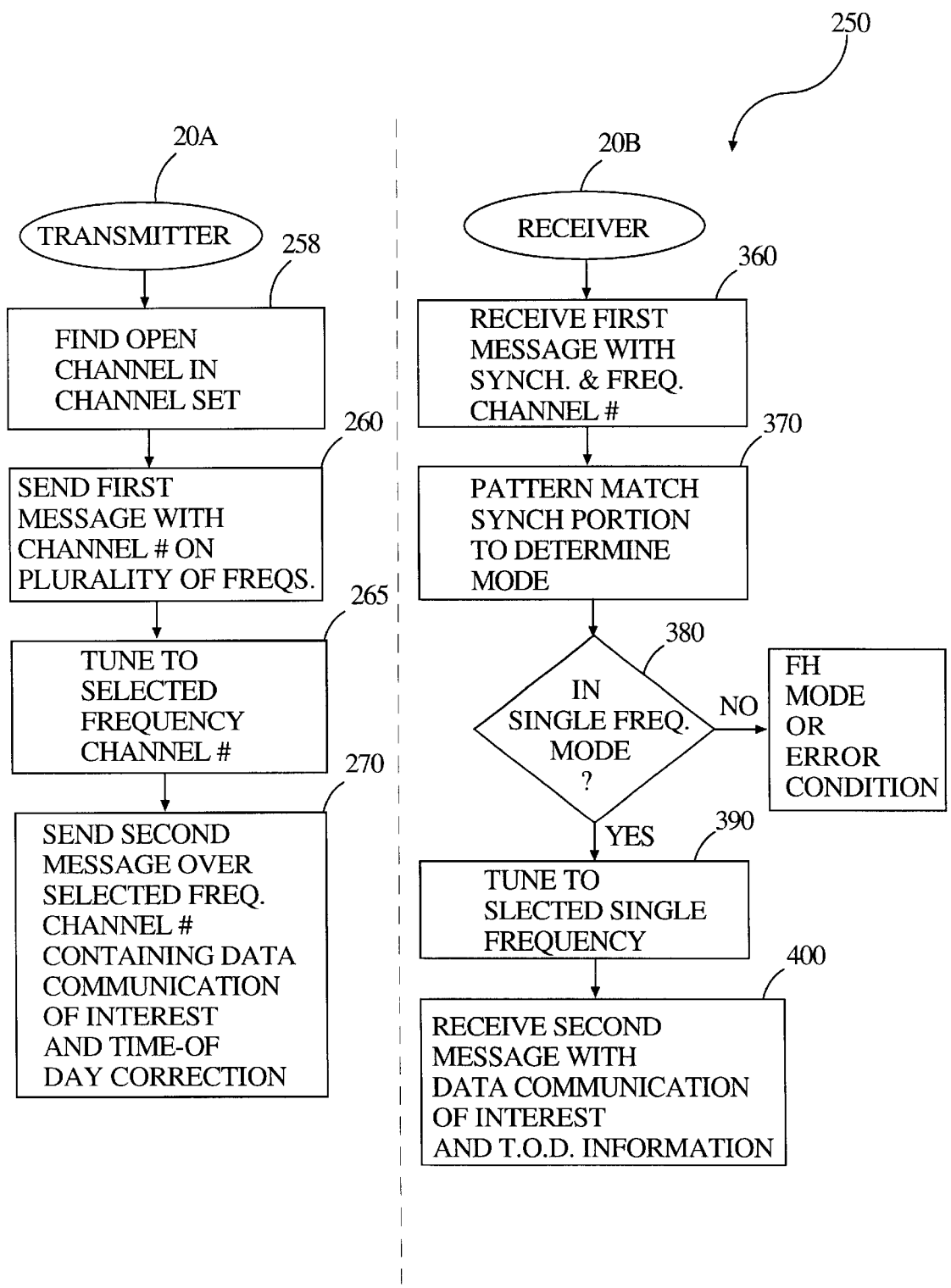
FIG. 7 is a flow chart depicting the transmission sequence and receiver sequence for transceiving a data communication in single frequency mode according to embodiment A of the present invention.
Figure 8:
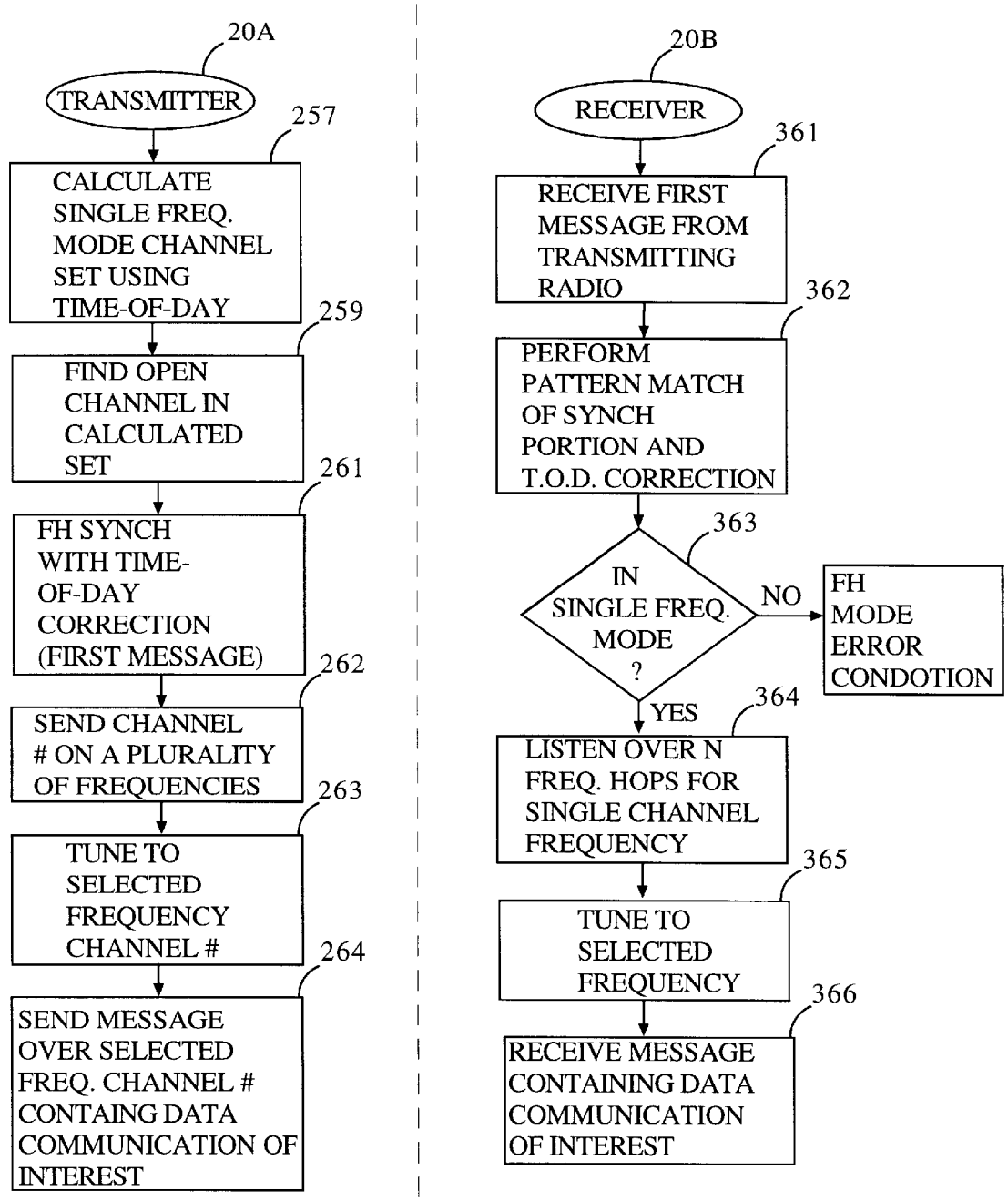
FIG. 8 is a flow chart depicting the transmission sequence and receiver sequence for transceiving a data communication in single frequency mode according to an alternative embodiment B of the present invention.

Note further that this set of frequencies consists of the frequency hopping frequencies allocated for FH operation over the particular network in use by the radio. In one preferred embodiment, the single frequency set contains 16 frequencies. Note that frequency set sizes are normally powers of 2. Furthermore, the number of frequencies (e.g. 16) may be in one embodiment, a fixed set of single frequency channels. In an alternate embodiment, there may exist a changing set of single frequency channels changing based on a Time-of-Day algorithm. FIG. 7 provides a flow chart of the steps involved at the transmitting and receiving radios associated with the fixed frequency set embodiment, while FIG. 8 illustrates the actions required at the transmitting and receiving radios for the changing set of frequency channels based on time-of-day using a Time-Of-Day based algorithm. Thus, if the system maintains the same Time-Of-Day at the receiver and the transmitter, the frequency set is the same at both locations.

Figure 6:
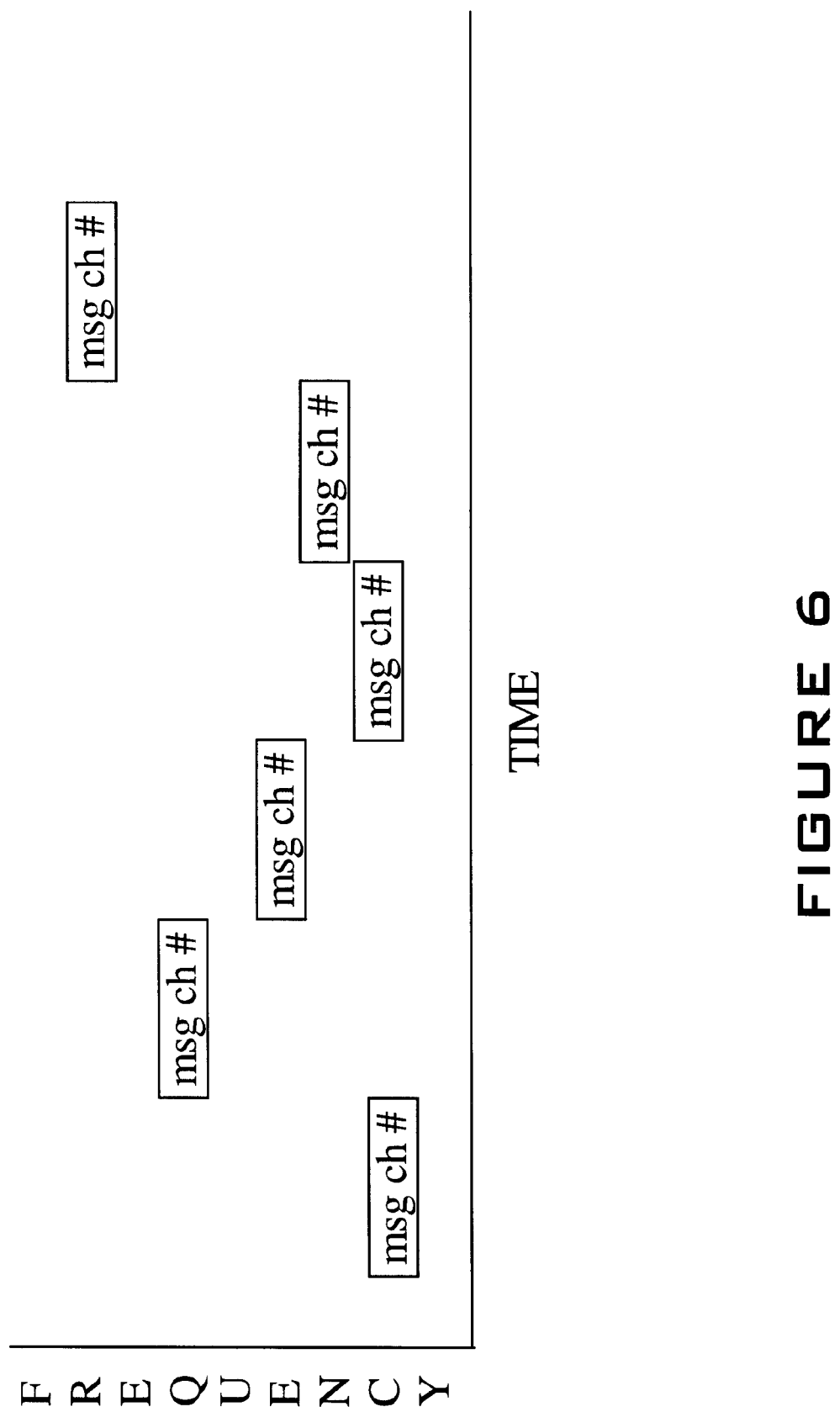
FIG. 6 is a graphical representation of the transmission of message channel numbers of the selected message channel number for single frequency transmission which is sent on a plurality of hopping frequencies according to the present invention.

For the 16 frequency set, the selected frequency number which is associated with the particular hopping frequency ranges from 0 to 15. This requires 4 bits to convey the information. Since each additional bit increases the frequency set size by a power of 2, the maximum frequencies can be addressed with the fewest bits if the set size is a power of 2. The selected frequency number is transmitted on the same frequencies as used for FH synchronization. FIG. 6 provides an illustration of a message channel number sent on multiple frequencies.

Figure 4:
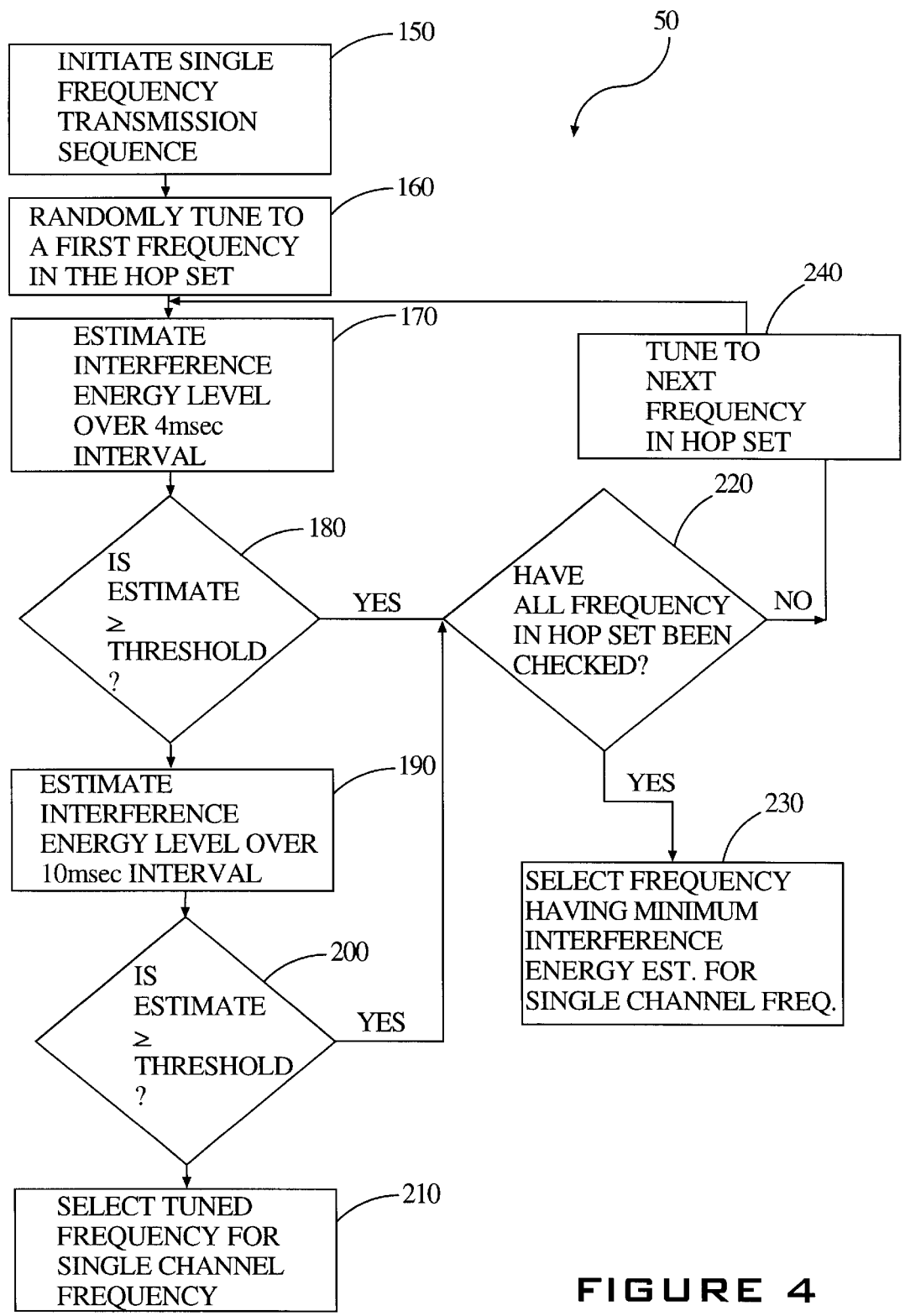
FIG. 4 is a flow chart illustrating the steps for selecting a frequency for single frequency transmission.

Referring now to FIG. 7, there is shown a flow chart 250 depicting the single frequency transmission sequence which occurs at a transmitter terminal upon selection of a frequency for Single Frequency (SF) mode. In the case of a fixed set of frequencies, transmitting radio 20A first finds an "open" channel (i.e. a frequency having interference levels meeting the requirements for single frequency transmission) in the frequency channel set (module 258) as illustrated in FIG. 4 and transmits a first message (module 260) which has a synchronization portion comprising a data pattern which is indicative of the single frequency operational mode and a second data portion coded with a frequency channel number indicative of the frequency selected. This message is transmitted on a plurality of, and may be transmitted on all, FH synchronization frequencies to permit all receiver radios within range to receive the message and to tune to the selected frequency. FIG. 7 also depicts the receiver 20B which receives the first message including the synchronization pattern and the selected frequency channel number (module 360) and performs a pattern match of the synchronization pattern with a known pattern to determine what mode of signal is being received. If the pattern match (module 370) is indicative of single frequency mode of operation (module 380), the processor at the receiving radio operates to tune to that selected frequency (module 390) for receiving a second message containing a data communication of interest and time-of-day correction (module 400).

The transmitting radio, upon sending of the first synchronization message with the selected frequency channel number (module 260) then tunes to the single frequency channel (module 265) and sends a second message containing the data communication of interest and including a time-of-day correction portion over only the selected frequency channel (module 270). In this manner, a data communication is transmitted over a frequency channel which has low interference energy and thus, transceives the data communication in a more reliable manner and with less probability of error or interference, than in a noisy frequency hopping communication mode.

An alternative embodiment is depicted in FIG. 8 where a changing set of single frequency channels based on time-of-day is used as the transmission set. As shown in FIG. 8, the transmitting radio 20A, when requested to send a message in single frequency mode, first determines the set of frequencies over which to select transmission by caculating a time-of-day offset value and using the calculated value to obtain the frequency set (module 257). The transmitter then finds an "open" channel (i.e. a frequency having interference levels meeting the requirements for single frequency transmission) in the frequency channel set (module 259) as illustrated in FIG. 4. However, rather than sending the channel number on a plurality of frequencies, the transmitter operates to send a frequency hopping (FH) synchronization message including a Time-Of-Day correction data portion via a pseudo random algorithm over a plurality of frequencies (module 261). The transmitter then sends a repeated message over N additional FH hops containing the single frequency channel number (module 262).

In the receiving radio 20B, a receiver receives the first message (module 361) and performs a pattern match to determine the operating mode (module 362,363) and receives a Time-Of-Day correction. The receiving radio then listens over the next N number of frequency hops for the single channel frequency number (module 364). The transmitter then tunes to the selected frequency (module 263) and sends a message over the selected frequency channel which contains the data communication of interest (module 264) which is received by the receiving radio which has tuned to the selected frequency (modules 365,366). In this embodiment, where the frequencies in the frequency hop set are not fixed, but are rather a rolling set of frequencies, the synchronization process including time of day correction, operates to permit the transmitter to appropriately transmit and the receiver to properly receive and demodulate the transmitted communication. Further in this embodiment, the preferred number of N additional hops over which the single channel number to be repeatedly transmitted is 4, thereby allowing good probability of success with a large percentage of frequencies with high interference. (i.e. good probability of receiver detection over one of those repeated hops).

Figure 9:
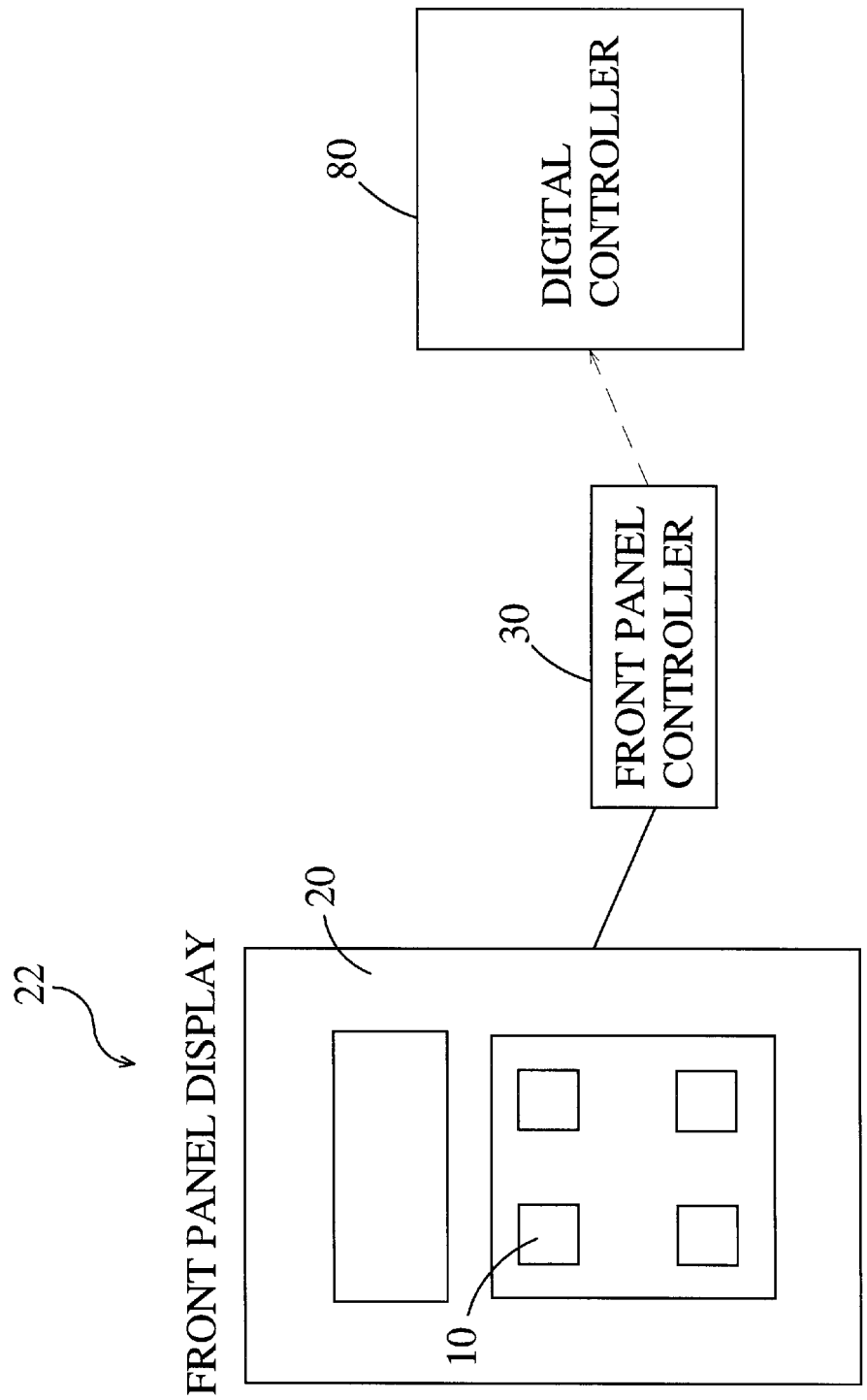
FIG. 9 is a block diagram illustrating a manual initiation of single frequency mode of operation according to the present invention.

FIG. 9 provides a schematic illustration of a manual means for placing a radio in either signle frequency or FH mode. Referring now to FIG. 9, the mode of operation of a particular radio may be updated upon depression of a key on a front panel of the radio to generate a signal indicative of either the frequency hopping mode or single frequency mode of operation. For example, in manual single frequency mode, a user would depress single frequency key 10 on front panel display 20 to cause a signal from front panel controller 30 to digital controller 80 in order to change the mode of operation to single frequency. As one can ascertain, a similar process would occur for a manual selection of frequency hopping mode. Upon updating of a particular operational mode, operation of the transmitter and receiver radios and the processing step associated with transmission in a single frequency mode, as well as selection of the single frequency occurs in the same fashion as previously described.

The above-described apparatus and method may be applied to Combat Net Radios using the Frequency Hop mode of communication. It should be understood that a person may make many variations and modifications to the embodiments utilizing functionally equivalent elements to those described herein. Any and all such modifications as well as others which may become apparent to those skilled in the art, are intended to be included within the scope of the invention as defined by the appended claims.

What is claimed is:

1. In a frequency hopping (FH) communication system comprising a plurality of radios operable in a first FH mode for transceiving information over a plurality of frequency channels corresponding to a plurality of frequencies defining a frequency hopping set, an improved radio device operable in a second single frequency mode for transmitting said information over a single frequency channel within said frequency hopping set, the improvement therewith comprising:

determination means associated with each of said radios for determining a quality of frequency hopping transmissions received in said first FH mode and providing a control signal when said quality is unacceptable; and means responsive to said control signal for operating said radio in said second single frequency mode for transmitting said information over only said single frequency channel within said frequency hopping set.

2. The radio according to claim 1, wherein said determination means comprises:

receiver means for sequentially listening on a plurality of said hopping frequencies and estimating an interfering energy level associated with each of said plurality of hopping frequencies listened to for comparison with a receiving threshold value, and for counting the number of said hopping frequencies listened to; and comparator means for comparing the number of said hopping frequencies exceeding said receiving threshold value for providing said control signal indicative of said unacceptable level when a selected percentage of said counted frequencies exceeds said receiving threshold value.

3. The radio according to claim 1, wherein said means responsive to said control signal for operating said radio in said single frequency transmission mode comprises:

selection means for selecting a frequency from said frequency hopping set having an interfering energy level less than a threshold value, wherein said selected frequency represents the single frequency over which said information is transmitted.

4. The radio according to claim 3, wherein said means responsive to said control signal for operating said radio in said single frequency transmission mode for transmitting said information over only a single frequency channel is operative to transmit a first message over said plurality of hopping frequencies which includes information indicative of said selected frequency to enable at least one other of said plurality of radios to tune to said selected frequency.

5. The radio according to claim 4, wherein said first message further includes a synchronization portion for synchronizing with said at least one other radio.

6. The radio according to claim 5, wherein said synchronization portion includes time of day offset correction.

7. The radio according to claim 3, wherein said selection means comprises:

means for tuning to a frequency within said frequency hopping set;

estimation means for estimating an energy level associated with said tuned frequency;

comparison means for comparing the estimated energy level with said threshold value to determine whether said tuned frequency is the frequency to be selected.

8. In a frequency hopping (FH) communication system comprising a plurality of radios operable in a first FH mode for transceiving information over a plurality of frequency channels corresponding to a plurality of frequencies defining a frequency hopping set, a method for adaptively selecting a single frequency channel within said frequency hopping set and transmitting said information over only said single frequency channel, said method comprising the steps of:

determining a transmission quality of frequency hopping transmissions received at a receiving radio terminal in said first FH mode and providing a control signal when said transmission quality is unacceptable; and operating said radio in a single frequency mode in response to said control signal when said transmission quality is unacceptable by transmitting said information over only a single selected frequency channel within said frequency hopping set, wherein said single selected frequency channel has an interfering energy level below a threshold value indicative of acceptable transmission quality.

9. The method according to claim 8, wherein said determination step comprises:

sequentially listening on a plurality of said hopping frequencies and estimating an interfering energy level associated with each of said plurality of hopping frequencies listened to for comparison with a receiving threshold value;

maintaining a count of the number of hopping frequencies listened to; and comparing the number of hopping frequencies exceeding said receiving threshold value for providing said control signal indicative of said unacceptable level when a selected percentage of said counted frequencies exceeds said receiving threshold value.

10. The method according to claim 8, wherein the step of operating said radio in said single frequency transmission mode further comprises the step of:

transmitting a first message over said plurality of hopping frequencies which includes a data portion indicative of said single selected frequency to enable at least one other of said plurality of radios to tune to said single selected frequency, wherein said first message is transmitted prior to transmission of said information over said single selected frequency.

11. The method according to claim 10, wherein said first message further includes a synchronization portion for synchronizing with said at least one other radio.

12. The method according to claim 11, wherein said synchronization portion includes time of day offset correction.

13. The method according to claim 8, wherein the step of transmitting said information over only a single selected frequency channel within said frequency hopping set which has an interfering energy level below said threshold value indicative of acceptable transmission quality further comprises the steps of:

tuning to a frequency within said frequency hopping set;

estimating an interfering energy level associated with said tuned frequency; and comparing the estimated interfering energy level with said threshold value to determine whether said tuned frequency is the frequency to be selected.

14. In a frequency hopping radio communications system having a set of frequencies defining a frequency hopping set, a method for adaptively selecting and transmitting a data communication on a single frequency within said hopping set when transmitting quality associated with FH data communication is of an unacceptable level, said method comprising the steps of:

at a transmitting terminal, selecting a frequency from said hopping set having an interfering energy level less than a threshold value;

transmitting a first message over at least one frequency within said hopping set having a data portion indicative of said selected frequency;

at a receiving terminal, receiving said first message and tuning to said selected frequency indicated by said data portion for receiving said data communication; and at said transmitting terminal, transmitting a second message containing said data communication over only said selected frequency.

15. The method according to claim 14, wherein the step of selecting said frequency within said frequency hopping set having an interfering energy level less than said threshold value, further comprises the steps of:

a) tuning to a frequency within said hopping set;

b) estimating an interfering energy level associated with said tuned frequency over a first time interval;

c) comparing said estimated interfering energy level with said threshold value, wherein said tuned frequency is the selected frequency when said estimated interfering energy level is below said threshold value, and d) tuning to another frequency within said hopping set and repeating steps b and c when said estimated interfering energy level associated with the tuned frequency is not below said threshold value.

16. The method according to claim 15, wherein the step of selecting said frequency further comprises the steps of:

re-estimating said interfering energy level on said tuned frequency over a second time interval; and comparing said re-estimated energy level with said threshold value to determine whether said tuned frequency is to be selected.

17. The method according to claim 16, wherein said first time interval is of shorter duration than said second time interval.

18. The method according to claim 14, wherein said first message further comprises a synchronization portion for synchronizing said transmitting and receiving terminals, said synchronization portion including a synchronization pattern indicative of data communication over only said selected frequency.

19. The method according to claim 18, wherein said synchronization pattern comprises a plurality of disjointed data patterns.

20. The method according to claim 19, wherein each said data pattern is biphase modulated by one information bit.

21. The method according to claim 15, wherein said step of tuning to a frequency in said hopping set further comprises randomly tuning to a first frequency for providing uniform channel usage.

22. The method according to claim 20, wherein said synchronization data pattern further includes data indicative of a time of day offset correction.

23. The method according to claim 14, wherein said frequencies in said hopping set are a fixed set.

24. The method according to claim 22, wherein said frequencies in said hopping set change in accordance with said time of day.

25. The method according to claim 14, further comprising the step of selecting the frequency within said hopping set having a minimum interfering energy level in comparison with all other frequencies in said hopping set upon determination that no frequency within said hopping set exists having an interfering energy level less than said threshold value.

26. In a frequency hopping communications system, an apparatus for adaptively selecting one frequency from a set of frequencies in said frequency hopping system defining a hopping set, and transmitting a data communication to at least one receiver over only that selected frequency, said apparatus comprising:

selection means for selecting a frequency from said hopping set having an interfering energy level less than a threshold value;

transmission means responsive to said selection means for transmitting on said hopping set frequencies a message which includes information indicative of said selected frequency to enable at least one receiver to tune to said selected frequency;

wherein said transmission means is operative to send a second message for synchronizing with said at least one receiver and upon completion of said synchronization, to transmit said data communication to said at least one receiver over only said selected frequency.

27. The apparatus according to claim 26, wherein said selection means comprises:

means for tuning to a frequency in said hopping set;

estimation means for estimating an energy level associated with said tuned frequency;

comparison means for comparing the estimated energy level with said threshold value to determine whether said tuned frequency is the frequency to be selected.

28. The apparatus according to claim 26, wherein said transmission means is responsive to said selection means for transmitting said first message on all frequencies within said frequency hopping set.

29. In a frequency hopping radio communication system comprising a plurality of radios for transceiving data with one another and arranged in a network, a method for adaptively selecting and transceiving data over said network on a selected frequency within a frequency hopping set, said method comprising the steps of:

at a transmitting terminal of one of said plurality of radios, selecting a frequency within said frequency hopping set having a minimum interfering energy level in comparison to all other frequencies within said frequency hopping set;

sending a message from said transmitting terminal over all frequencies within said frequency hopping set which includes data indicative of said selected frequency having said minimum interfering energy level;

at said transmitting radio, tuning to said selected frequency and transmitting a message comprising a synchronization pattern and a time of day followed by said data for said data communication over only said selected frequency;

at a receiving terminal of a receiving radio, demodulating said first message for obtaining said selected frequency;

tuning to said selected frequency and receiving said synchronization pattern, said time of day, and said data for the data communication on said selected frequency.

30. The method according to claim 29, wherein the step of selecting a frequency having a minimum interfering energy level comprises:

randomly tuning to a frequency within said frequency hopping set;

estimating an energy indicative of a level of interference on said randomly tuned frequency during a first time interval and comparing said energy with a threshold value;

re-estimating said estimated energy level on said randomly tuned frequency during a second time interval when said estimated energy is below said threshold; and selecting said randomly tuned frequency when said estimated and re-estimated energy levels during said first and said second time intervals fall below said threshold value and if either said estimated and re-estimated energy levels are above said threshold value, tuning to an alternative frequency within said frequency hopping set and repeating the steps of estimating and re-estimating.

31. The method according to claim 29, further comprising the steps of storing in memory each of the estimated energy levels and comparing said estimated energy levels with one another to obtain a frequency associated with a lowest energy level.

32. In a frequency hopping data communication system, a radio operable in a first frequency hopping (FH) mode for transceiving data communication over a set of hopping frequencies defining a frequency hopping set and in a second single frequency mode for transceiving data communication over a single frequency within said frequency hopping set, said radio comprising:

receiver means for sequentially listening on a plurality of said hopping frequencies, said receiver means including estimation means for estimating an interfering energy level associated with each of said frequencies listened to for comparison with a receiving threshold value, and for counting the number of frequencies listened to;

switching means responsive to said estimation means for automatically switching said radio from said first FH mode to said second single frequency mode when a selected percentage of said counted frequencies exceed said receiving threshold value; and transmitter means responsive to said switching means for transmitting said data communication in said first mode over said set of hopping frequencies, and in said second mode over only said single frequency, said transmitter means operable in said second mode and having;

selection means for selecting a frequency from said hopping set having an interfering energy level less than a threshold value; wherein said selected frequency represents the single frequency over which said data communication is transmitted.

33. The radio according to claim 32, further comprising manual means responsive to a user request for switching said radio between said FH and said single frequency modes.

34. In a frequency hopping data communication system comprising a plurality of radios arranged in a communication network, a method for adaptively switching from a frequency hopping communication mode to a single frequency communication mode for transceiving a data communication between at least two of said plurality of radios, said method comprising the steps of:

at a receiving terminal, sequentially listening to a plurality of frequency channels corresponding to a frequency hopping set and estimating an interference energy associated with each of said listened to frequency channels;

comparing said estimated energy for each of said listened to frequency channels with a receiver threshold value and recording parameters associated with each of said frequency channels;

performing a statistical analysis of said recorded parameters including the number of frequency channels exceeding said receiver threshold value to cause said radio to enter said single frequency mode;

at a transmitting terminal of said radio, selecting a frequency from said frequency hopping set having an interfering energy level less than said receiver threshold value and transmitting said data communication over only said selected frequency.

35. The method according to claim 34, further comprising the steps of:

transmitting a first message over a plurality of frequencies within said frequency hopping set which includes a data portion indicative of said selected frequency and a synchronization portion indicative of said radio mode of operation for notifying a receiving terminal of another radio of said plurality of radios of said data communication mode and said selected frequency channel.

36. The method according to claim 34, further comprising the step of at said receiving terminal of said another radio, receiving said first message and tuning to said selected frequency for receiving said data communication.

* * * * *